Patented Apr. 16, 1940

2,197,003

UNITED STATES PATENT OFFICE 2,197,003

PROCESS FOR MAKING PIGMENTS

Kenneth S. Mowlds, Baltimore, Md., assignor to The Glidden Company, Cleveland, Ohio, a corporation of Ohio No Drawing. Application November 18, 1937, Serial No. 175,247

16 Claims. (Cl. 23—122)

The present invention relates to the production of pigmentary calcium sulphate. More specifically it relates to the production of pigmentary calcium sulphate from sulphuric acid solutions containing iron.

In the manufacture of titanium dioxide pigments large amounts of waste mother liquor are produced. This mother liquor results from the hydrolysis of a sulphuric acid solution of the titanium ore, such as ilmenite and contains large amounts of both sulphuric acid and iron in the ferrous state. The mother liquor also contains small amounts of other metals such as copper, manganese, chromium, and vanadium, as well as some residual titanium sulphate. Pigmentary calcium sulphate cannot be made from such waste mother liquor by merely neutralizing with calcium carbonate or lime. The precipitate of calcium carbonate will contain iron and other metals present in the mother liquor which destroys the pigmentary property of the calcium sulphate.

According to the present invention a pigmentary calcium sulphate is prepared from waste mother liquor and calcium carbonate or lime. The invention, however, is applicable to other sulphuric acid solutions containing ferrous iron with or without additional coloring metals. The invention is likewise applicable to solutions containing ferric iron, provided the iron is first reduced to the ferrous state. Lime may also be used in place of calcium carbonate. A typical waste mother liquor which is suitable for use in the production of pigmentary calcium sulphate according to the present invention is as follows:

| | g./l. |
|---|---|
| Total $H_2SO_4$ | 225 |
| Free $H_2SO_4$ | 150 |
| Iron | 50 |
| $TiO_2$ | 5.0 |
| $MnO_2$ | 0.5 |
| $Cr_2O_3$ | 0.1 |
| Cu | 0.1 |
| $V_2O_5$ | 0.1 |

The amounts of the various ingredients are represented by the values given, calculated as indicated.

While the amounts of manganese, vanadium, chromium and copper are small, they are present in sufficient amounts to destroy the pigment properties of the calcium sulphate, unless removed. The iron of course must also be removed. Likewise the titanium present must be removed since it is present in such a condition that if it remains in the final product it destroys the pigment properties. It is believed that the titanium in the mother liquor forms the ortho-titanic acid rather than the meta form, and in this form has no pigment properties.

The mother liquor is treated with limestone, or calcite, preferably ground so that 99% will pass through a 325 mesh screen, is slurried in water in amount sufficient to precipitate calcium sulphate. Preferably the amount of calcium carbonate added is such that from 5 to 15 grams of free sulphuric acid per liter remain. This prevents the precipitation of ferrous carbonate, which can be gotten back into solution only with difficulty, and at the same time allows for a high recovery of calcium sulphate. The precipitate is then filtered and washed with water which is slightly acidulated with sulphuric acid, until the filtrate is free from iron. The precipitate is then repulped in a weak sulphuric acid solution and again washed with weak sulphuric acid solution until the filtrate is iron free. This process may be repeated until substantially all of the ferrous iron is removed from the precipitate which can be removed.

During the precipitation of the calcium sulphate and the washing described above it is important that the iron be left in the ferrous state. If ferric iron is present in the proportions in which iron is present, particularly in the mother liquor, it will hydrolyze and precipitate. It is then hard to get the iron in solution. Accordingly it is desirable to prevent oxidation during these washings, at least until the iron content is below that at which ferric sulphate would hydrolyze.

After the precipitate of calcium sulphate has been washed with weak sulphuric acid it still contains some ferrous iron which is almost impossible to remove by washing as well as chromium, vanadium, copper, manganese, etc. At this point the precipitate is treated with a weak sulphuric acid solution containing an oxidizing agent, whereby the residual iron and the copper, manganese, chromium and vanadium are oxidized. The material is then washed with weak sulphuric acid solution and substantially all of the remaining iron and the copper manganese, chromium and vanadium are washed out. The substantially pure calcium sulphate is then calcined to a temperature at which the calcium sulphate loses water. This calcination also drives off the sulphuric acid retained by the material. However, if it is desired not to calcine at a temperature which drives off the sulphuric acid, it may be neutralized with common neutralizing agents.

In carrying out the precipitation of the calcium sulfate it has been found desirable to mix the mother liquor and the calcium carbonate slurry as rapidly as is commercially possible to effect as rapid a precipitation as possible. The rapid precipitation of the calcium sulfate results in an improvement in the tinting strength of the finished pigment.

The washings are preferably carried out at room temperatures or below. The acid washes are preferably made up by adding about 5% of concentrated sulphuric acid to the water, although more or less can be used. For the oxidizing treatment about 10% acid has been found to give the best results and the oxidation is preferably carried out by heating at the boiling point to get better solution and increased oxidizing action. The same results can be obtained, however, without heating, but the action is slower. Ammonium persulphate, nitric acid, sodium perchlorate, and sodium or calcium hypochlorite have been found to be suitable oxidizing agents. In the case of ammonium persulphate 1% by weight of the calcium sulphate has been found sufficient when employing a mother liquor having the composition substantially as that previously mentioned.

In carrying out the process the titanium sulphate is removed in the first washings and reslurries along with the major amount of the iron in the ferrous state. After oxidation substantially all of the remaining iron as ferric iron, and the copper, chromium, vanadium and manganese, etc. are removed. It is believed that the oxidizing treatment changes the adsorption of the colored ions of iron, manganese, copper, chromium, vanadium, etc. by the finely divided or colloidal precipitate. The "ous" ions are more readily adsorbed by the precipitate than are the "ic" ions and as such are more readily washed out of the precipitate. In the case of iron there is apparently some kind of selective adsorption so that better results are obtained by removing the last amounts of iron as ferric iron.

While certain examples and preferred procedures have been given it is understood that various changes and modifications can be made without departing from the invention.

What is claimed and desired to secure by Letters Patent of the United States is:

1. The process of preparing a pigmentary calcium sulphate from a sulphuric acid solution containing iron all of which is in the ferrous state, which comprises treating the solution with calcium carbonate, washing the precipitate, while maintaining the iron in the ferrous condition, treating the precipitate with an oxidizing agent, and again washing.

2. The process for preparing a pigmentary calcium sulphate from waste mother liquor containing ferrous iron resulting from the hydrolysis of a titanium sulphate solution which comprises treating the mother liquor with calcium carbonate, washing the precipitate while maintaining the iron in the ferrous condition until substantially all of the ferrous iron is removed, treating the washed precipitate with an oxidizing agent and again washing the precipitate.

3. The process of claim 2 in which the amount of calcium carbonate is such that from 5–15 grams of free sulphuric acid remains per liter.

4. The process of claim 2 in which the washings are made with weak sulphuric acid solutions.

5. The process of claim 2 in which the oxidizing action is carried out in the presence of a weak sulphuric acid solution.

6. The process of preparing a pigmentary calcium sulphate from waste mother liquor containing ferrous iron resulting from the hydrolysis of a titanium sulphate solution which comprises treating the mother liquor with calcium carbonate, washing the precipitate while maintaining the iron in the ferrous state until substantially no more iron is washed out, treating the washed precipitate with an oxidizing agent, and again washing.

7. The process of preparing a pigmentary calcium sulphate from waste mother liquor containing ferrous iron resulting from the hydrolysis of a titanium sulphate solution which comprises treating the mother liquor with calcium carbonate, washing the precipitate while maintaining the iron in the ferrous condition until the filtrate is substantially free from iron, reslurrying the precipitate and again washing and continuing this process until substantially no more iron is removed, then treating the precipitate with an oxidizing agent and again washing.

8. The process of claim 7 in which the washings are made with water weakly acidulated with sulphuric acid.

9. The process of preparing a pigmentary calcium sulphate from waste mother liquor containing ferrous iron resulting from the hydrolysis of a titanium sulphate solution which comprises treating the mother liquor with calcium carbonate, washing the resulting precipitate with a weak sulphuric acid solution while maintaining the iron in the ferrous state, treating the washed precipitate with a weak sulphuric acid solution containing an oxidizing agent, and again washing the precipitate.

10. The process of preparing a pigmentary calcium sulphate from waste mother liquor resulting from the hydrolysis of a titanium sulphate solution prepared from ilmenite and in which the iron is in the ferrous state which comprises treating the mother liquor with calcium carbonate, washing the resulting precipitate while maintaining the iron in the ferrous state, treating the washed precipitate with an oxidizing agent and again washing the precipitate.

11. The process of preparing pigmentary calcium sulphate from a sulphuric acid solution containing iron, comprising treating the sulphuric acid solution with calcium carbonate, washing the resulting precipitate with a weak sulphuric acid solution, treating the washed precipitate with an oxidizing agent in the presence of a weak sulphuric acid solution, again washing the precipitate with a weak sulphuric acid solution, then neutralizing and calcining the precipitate.

12. The process of claim 11 in which the calcination temperature is sufficient to dehydrate the calcium sulphate.

13. The process of preparing a pigmentary calcium sulphate from a sulphuric acid solution containing ferrous iron, which comprises treating the solution with a calcium compound selected from the class consisting of calcium carbonate and lime, washing the resulting precipitate while maintaining the iron in the ferrous condition, treating the washed precipitate with an oxidizing agent and again washing the precipitate.

14. The process of preparing a pigmentary calcium sulphate from calcium sulphate containing iron and such other color forming metals as copper, vanadium, manganese and chromium, which comprises washing the calcium sulphate while maintaining the iron and the other color forming metals in the reduced state, oxidizing the reduced iron and color forming metals and again washing the calcium sulphate.

15. The process of preparing a pigmentary calcium sulphate from a sulfuric acid solution containing ferrous iron, which comprises treating the solution with a calcium compound selected from the class consisting of calcium carbonate, and lime and washing the resulting precipitate while maintaining the iron in the ferrous condition with water slightly acidulated with sulfuric acid until substantially no more iron is removed, treating the washed precipitate with a weak sulfuric acid solution containing an oxidizing agent, and washing the oxidized precipitate with water slightly acidulated with sulfuric acid.

16. The process of preparing a pigmentary calcium sulfate from a sulfuric acid solution containing ferrous iron which comprises treating the solution with a calcium compound selected from the class consisting of calcium carbonate and lime in such amount that from 5 to 15 grams of free sulfuric acid per liter remains, filtering the precipitate while maintaining the iron in the ferrous condition, and washing the precipitate with water slightly acidulated with sulfuric acid until substantially no more iron remains, treating the washed precipitate with a weak sulfuric acid solution containing an oxidizing agent, and washing the oxidized precipitate with water slightly acidulated with sulfuric acid.

KENNETH S. MOWLDS.